Oct. 27, 1964 H. SCHWAB ETAL 3,154,770

DIGITAL DATA PROCESSOR

Filed Aug. 31, 1959 5 Sheets-Sheet 1

INVENTORS.
HELMUT SCHWAB
ROBERT E. SANDIFORD
BY Christie, Parker & Hale
ATTORNEYS

DIGITAL DATA PROCESSOR

Filed Aug. 31, 1959 5 Sheets-Sheet 2

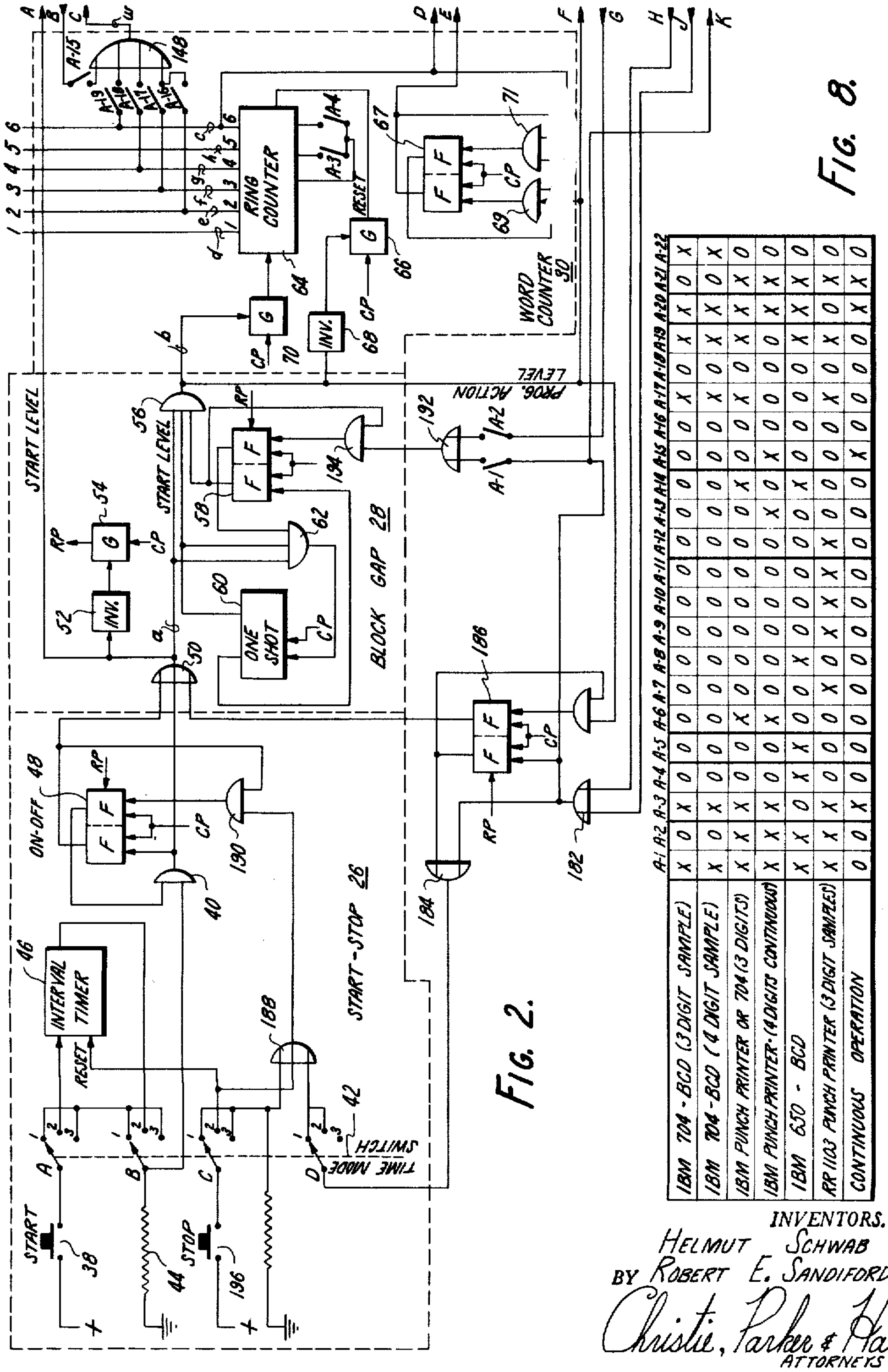

FIG. 2.

| | A-1 | A-2 | A-3 | A-4 | A-5 | A-6 | A-7 | A-8 | A-9 | A-10 | A-11 | A-12 | A-13 | A-14 | A-15 | A-16 | A-17 | A-18 | A-19 | A-20 | A-21 | A-22 |
|---|---|---|---|---|---|---|---|---|---|---|---|---|---|---|---|---|---|---|---|---|---|---|
| IBM 704-BCD (3 DIGIT SAMPLE) | X | 0 | X | 0 | 0 | 0 | 0 | 0 | 0 | 0 | 0 | 0 | 0 | 0 | 0 | 0 | X | 0 | X | X | 0 | X |
| IBM 704-BCD (4 DIGIT SAMPLE) | X | 0 | X | 0 | 0 | 0 | 0 | 0 | 0 | 0 | 0 | 0 | 0 | 0 | 0 | 0 | X | 0 | X | X | 0 | X |
| IBM PUNCH PRINTER OR 704 (3 DIGITS) | X | X | X | 0 | 0 | X | 0 | 0 | 0 | 0 | 0 | 0 | 0 | X | 0 | 0 | X | 0 | X | X | X | 0 |
| IBM PUNCH PRINTER-(4 DIGITS CONTINUOUS) | X | X | X | 0 | 0 | X | 0 | 0 | 0 | 0 | 0 | 0 | X | 0 | X | 0 | 0 | 0 | 0 | X | X | 0 |
| IBM 650 - BCD | X | X | 0 | X | X | 0 | 0 | X | 0 | 0 | 0 | 0 | 0 | X | 0 | 0 | 0 | 0 | 0 | X | X | 0 |
| RR 1103 PUNCH PRINTER (3 DIGIT SAMPLES) | X | X | X | 0 | 0 | 0 | X | 0 | X | X | X | X | 0 | 0 | 0 | 0 | X | 0 | X | 0 | X | 0 |
| CONTINUOUS OPERATION | 0 | 0 | X | 0 | 0 | 0 | 0 | 0 | 0 | 0 | 0 | 0 | 0 | 0 | X | 0 | 0 | 0 | 0 | X | X | 0 |

FIG. 8.

INVENTORS.
HELMUT SCHWAB
BY ROBERT E. SANDIFORD
Christie, Parker & Hale
ATTORNEYS

DIGITAL DATA PROCESSOR

Filed Aug. 31, 1959 5 Sheets-Sheet 3

INVENTORS.
HELMUT SCHWAB
ROBERT E. SANDIFORD
BY
Christie, Parker & Hale
ATTORNEYS Oct. 27, 1964 H. SCHWAB ETAL 3,154,770

DIGITAL DATA PROCESSOR

Filed Aug. 31, 1959 5 Sheets-Sheet 4

INVENTORS.
HELMUT SCHWAB
BY ROBERT E. SANDIFORD
Christie, Parker & Hale
ATTORNEYS Oct. 27, 1964 H. SCHWAB ETAL 3,154,770

DIGITAL DATA PROCESSOR

Filed Aug. 31, 1959 5 Sheets-Sheet 5

INVENTORS.
HELMUT SCHWAB
BY ROBERT E. SANDIFORD
Christie Parker & Hale
ATTORNEYS United States Patent Office 3,154,770
Patented Oct. 27, 1964

3,154,770

DIGITAL DATA PROCESSOR

Helmut Schwab, Altadena, and Robert E. Sandiford, Arcadia, Calif., assignors, by mesne assignments, to Consolidated Electrodynamics Corporation, Pasadena, Calif., a corporation of California Filed Aug. 31, 1959, Ser. No. 837,106
16 Claims. (Cl. 340—174.1)

This invention relates to digital processing equipment and, more particularly, is concerned with apparatus for accepting digital information from a number of different sources and arranging the information on magnetic tape in proper sequence and in accordance with a preset format to make the magnetic tape compatible with a selected one of a number of different known digital computers and other digital processing equipment.

Digital computers and other known digital processing equipment are capable of processing digital information and making calculations at lightning speed. Such equipment is generally designed to receive input information in various ways, one of the most flexible and fastest methods being to read in information from magnetic tape. However, each different type of computer or digital processing equipment requires its own special format, i.e., its own arrangement of magnetic bits on the tape to convey the proper information to the computer in the "language" of the computer. There is, at present, no standardization of formats.

The present invention provides a data acquisition and handling system for translating data derived from a number of different sources to any one of a number of different selectable formats for recording on magnetic tape. This system is characterized by its high speed in data processing, high accuracy, and particularly its compatibility with all standard computers. System flexibility is achieved by dividing the system into a number of fundamental sub-operational components, each of which can be modified independently of the other components to change a particular sub-operation. Basically, two types of operational control are provided, namely, data sequence control and time sequence control.

In brief, the apparatus for the present invention includes a plurality of sources of digital information, such as a source of constants, a source of accumulated time data, and a source of digitized data samples. Data sequence control permits the transfer from the several sources to magnetic tape in a number of different sequential patterns. Time sequence control permits complete cycling of the selected sequence pattern once, periodically at selected time intervals, or continuously, as desired.

A recycling word counter keeps count of the number of characters transferred to the tape. A source counter controls the sequence pattern of the sources. The source counter is synchronized with the recycling of the word counter so that complete words of fixed predetermined numbers of characters are transferred from a particular source before the next source in the sequence is activated.

Block gaps may be inserted between groups of data on tape after a preset number of digitized data samples have been transferred to tape. This is controlled by a sample counter. The several counters may be preset to produce different word lengths, different sequencing of data sources, and different block lengths, as required for any particular format.

For a more complete understanding of the invention, reference should be made to the accompanying drawings, wherein:

FIG. 1 is a block diagram of the data acquisition and handling system;

FIGS. 2 and 3 together show a detailed block diagram of the programming portion of the system;

FIG. 8 is a table showing switching arrangements of the programmer for a number of different standard formats.

Figures 1, 4, 6:
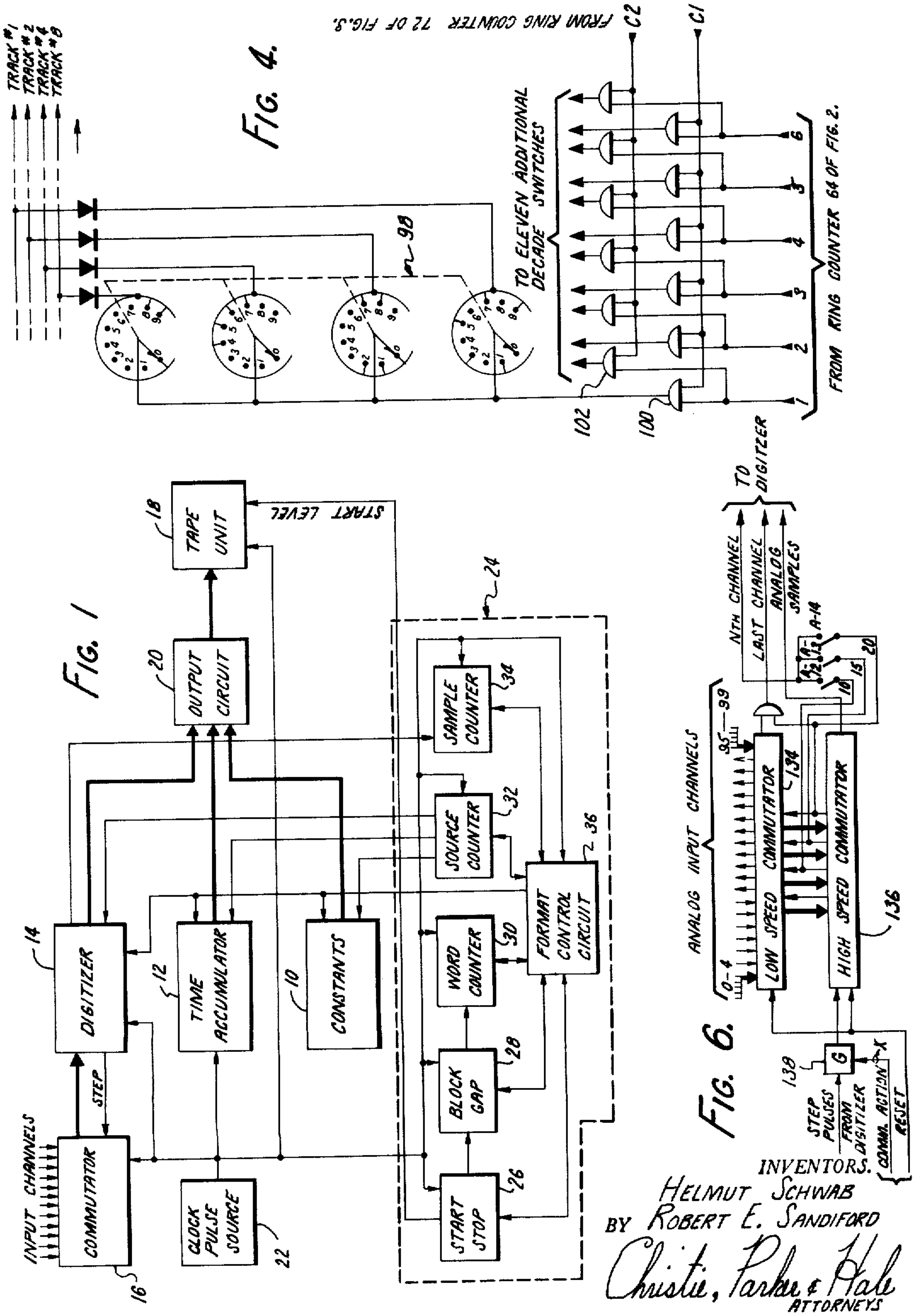
FIG. 4 shows a block diagram of a portion of a "constants" source.
FIG. 6 shows a detailed block diagram of a commutator for a plurality of analog information input channels.

Referring to FIG. 1, the basic system is shown in block form and is arranged to transfer digitized data from a number of sources for recording on magnetic tape. Three basic sources are shown, including a source 10 of constants, a source 12 of accumulated time information, and a digitizer 14 for digitizing analog voltages from a plurality of test points, sampled successively by a commutator 16. Additional digital sources may be incorporated if desired. Each of the three sources shown is connected to a magnetic tape unit 18 through an output circuit 20, which switches the signals from any of the three different sources to the recording input of the tape unit 18. The system may be arranged to provide digital information in a straight binary code or in binary-coded decimal form. Some modification using conventional binary coding techniques of the time accumulator 12 and the digitizer 14 is required to change from straight binary to binary-coded decimal coding, as hereinafter will be explained. The following detailed description, however, is directed, by way of example, primarily to operations using binary-coded decimal coding operation.

As is conventional in binary-coded decimal operation, four channels are used on magnetic tape, hereinafter referred to as tracks #1, #2, #4, and #8, corresponding to the well-known 1-2-4-8 weighted binary code for representing digital information. Binary coded digits or characters are represented by voltage levels on four lines from each of the three sources 10, 12 and 14 going to the output circuit 20, and by levels on four lines going from the output circuit 20 to the tape unit 18. Transfer of digits is synchronized with a clock pulse source 22. This corresponds to well known and conventional digital recording techniques.

Operational control and format control are achieved by the programming circuit indicated generally at 24. According to the present invention, the programming circuit is subdivided into fundamental sub-operational units or components which may be individually and independently modified to achieve the desired format of information laid down on the magnetic tape. These sub-operational units of the programming circuit include a start-stop circuit 26, a block gap circuit 28, a word counter 30, a source control counter 32, and a sample counter 34. These basic units are interconnected and controlled by circuit means generally indicated as a format control circuit 36 in FIG. 1.

Functionally, the start-stop circuit 26 provides a time sequencing control which may be set for one of three modes of operation, namely, one data sampling period only, repeated data sampling periods, or continuous operation. The first mode provides for a single sampling of selected data and is used for system checkouts or is useful in static tests where one sampling of all data points is sufficient. The second mode provides for one data sampling to be recorded at periodic intervals which may be spaced as desired. Repetition rates can be anywhere between milliseconds and hours. The third mode of time sequence control is the normal operation for a dynamic test at which all test points are sampled repetitiously at the maximum repetition rate of which the system is capable.

The source counter 32 functionally provides data sequence control according to one of the following data combinations, namely, constants only, time data followed by one digitized sampling of each of a group of analog inputs, or constants plus time data and digitized data. The first mode of sequence control is used in order to flag the data flow in the magnetic tape or computer. The constants used may have the meaning of a computer instruction, identification of a test run, or the like. The second alternative mode of sequence control is typical for a normal test run, and the third enumerated mode of sequence control in which constants are repeated in each data block is useful in formats for punched card output where constants are repeated for each punch card.

The block gap circuit 28 is arranged to insert a blank space on magnetic tape to separate information on the tape into blocks. It is required to effect certain selected formats. The block gap may be inserted as required by operation of the block gap circuit from the format control circuit 36, as will hereinafter be explained in detail.

The word counter 30 is arranged to control the number of characters in a word. It is common practice in most computers to operate on fixed numbers of characters at a time, referred to as a word. By means of the word counter 30, words of various selected character lengths can be established in transferring digits to the tape unit. The sample counter 34, in combination with the format control circuit 36, may be used to limit the number of words in a block. By means of the word counter 30 and the sample counter 34 in conjunction with the format control 36, the number of characters per sample, the number of samples per word, and the number of words per block on the magnetic tape can be controlled according to the desired format.

Typical formats for magnetic tape include, for example, and IBM 650 computer format in which up to five digits per sample and two samples per word are provided, corresponding to a ten-digit word. A block length may be sixty words or less which may be arranged, for example, as fifty words of digitized data plus one word of constants plus nine words of accumulated time information. Blocks gaps are inserted on the magnetic tape after sixty or less words are written on the tape. Another typical format for the magnetic tape, to make it compatible with an IBM 704 computer and punch card printer output, includes three digits per sample and two samples per word, forming a six-digit word. The block length corresponds to the storage capability of one IBM card. Time and constants information is inserted in each block. Thus, each block is limited preferably to three words of time information and constants, plus ten words of digitized information. The manner in which the present invention achieves these and any one of a number of other selectable formats will be apparent from the description which follows.

Figure 3:
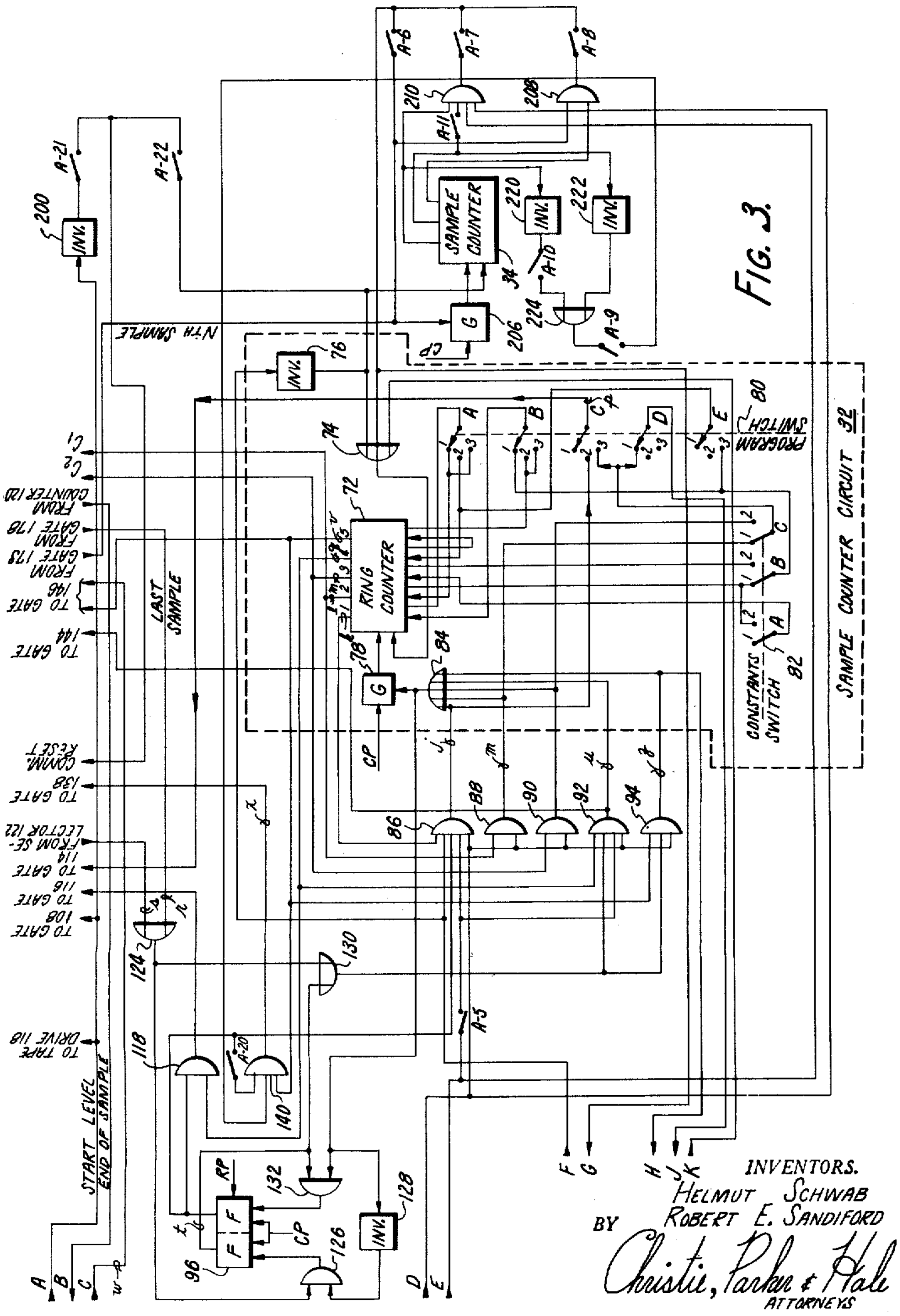

Referring to FIGS. 2 and 3 in detail, the start-stop circuit indicated generally at 26 (FIG. 2) includes a push button start switch 38 that connects a high level potential from a source (not shown) to one input of an "and" gate 40 through a time sequence selector switch indicated generally at 42. The selector switch 42 is manually set to one of three positions corresponding to single scan operation, repeated scan operation, and continuous scan operation. These are the three modes of time sequencing operation referred to above. For positions 1 and 3 of the selector switch, the "and" gate 40 is connected to the start switch 38 directly through the banks A and B of the selector switch. Normally, the input to the "and" gate 40 is maintained at a low potential by a resistor 44 connected to ground potential. With the selector switch in position 2, the start button switch 38 is connected to an interval timer 46 through the bank A. This starts the interval timer 46 which puts out a start impulse at any selected repetition interval, the start pulse being connected through the bank B of the switch 42 in position 2 to the "and" gate 40.

An ON-OFF toggle or flip-flop 48, having two stable states, is normally set to its "off" state by a reset pulse, designated RP. In the "off" state, a high level is provided at the "and" gate 40 from the toggle 48. When the start button is pressed, a high level is produced at the output of the "and" gate 40 which, at the time of the next clock pulse, designated CP throughout the drawings, sets the flip-flop 48 to its "on" state.

The output of the "and" gate 40 and the "on" side of the flip-flop 48 are applied to an "or" gate 50. Thus, a high level is provided at the output of the "or" gate following the pressing of the start button 38, at least for as long as the ON-OFF toggle 48 is set to its "on" condition. The waveform at the output of the "or" gate 50 is shown in FIG. *9a*.

The output of the "or" gate 50 is applied to the tape drive unit 18 to start the tape drive when the level goes high. Also, the output of the "or" gate 50 is applied to the time accumulator 12 to start a counter in the time accumulator when the level goes high. The time accumulator, as will hereinafter be described in detail in connection with FIG. 7, keeps count of the passage of time from the moment the level of the output of the "or" gate 50 goes high.

The output of the "or" gate 50 is applied to a reset circuit which includes an inverter 52, the output of which controls a gate 54 to which the clock pulses CP are applied. Thus, during the time the tape unit 18 is off and the output of the "or" gate 50 is low, the gate 54 is biased on by the inverter 52. The clock pulses passed by the gate 54 are used as reset pulses, designated RP, and are applied to the flip-flops throughout the programming circuit to reset the various flip-flops to their required initial state. The reset pulses are interrupted as soon as the output of the "or" gate 50 goes high.

The output from the "or" gate 50 is also applied to the block gap circuit indicated generally at 28. This circuit includes an output "and" gate 56 to which is applied the output level from the "or" gate 50, the "on" side of a bistable flip-flop 58, and the "off" side of a monostable (or one-shot) multivibrator 60. The flip-flop 58 is initially set by the reset pulse so as to apply a low potential to the "and" gate 56, thus insuring a low level at the output of the "and" gate 56. The one-shot multivibrator 60, in its normal or "off" state, applies a high level to the "and" gate 56.

The flip-flop 58 and the one-shot multivibrator 60 normally apply high level potentials to an "and" gate 62, the output of which controls the one-shot multivibrator 60. The output of the "or" gate 50 is also applied to the "and" gate 62 so that when the output level of the "or" gate 50 goes high, the output from the "and" gate 62 goes high, biasing the one-shot multivibrator 60 so that the next CP sets it to its unstable condition. The one-shot multivibrator 60, while in its unstable or "on" condition, applies a high level to the "on" side of flip-flop 58, causing it to be set to its opposite or "on" state in response to the next clock pulse, thereby applying a high level to the "and" gate 56.

After an interval of time determined by the recovery time of the one-shot multivibrator 60, it returns to its stable state, restoring a high level to the remaining input to the "and" gate 56, at which time the output of the "and" gate 56 goes high and remains high until the flip-flop 58 is reset to its initial condition. The output from the "and" gate 56, referred to as the programmer action level, thus goes high after a delayed interval determined by the one-shot multivibrator 60 after the level from the "or" gate 50 goes high. The programmer action level is shown in the waveform of FIG. *9b*. The programmer action level is used to initiate transfer from the several sources in sequence to the tape unit.

When the programmer action level from the "and" gate 56 goes high, it initiates counting of the word counter circuit 30. The word counter circuit includes a ring counter 64, preferably having six stable states, numbered accordingly in FIG. 2. The ring counter is preferably of a type described in detail in application No. 793,318, filed February 16, 1959, now Patent No. 3,083,907, and assigned to the same assignee as the present invention, although any ring counter which can be arranged to skip over one or more stable states during the counting operation may be employed. The ring counter 64 is initially set to its last or sixth stable state. Resetting of the ring counter 64 initially to the sixth stable state is provided by clock pulses passed by a gate 66 controlled by an inverter 68 from the programmer action level output of the "and" gate 56.

Figure 9:
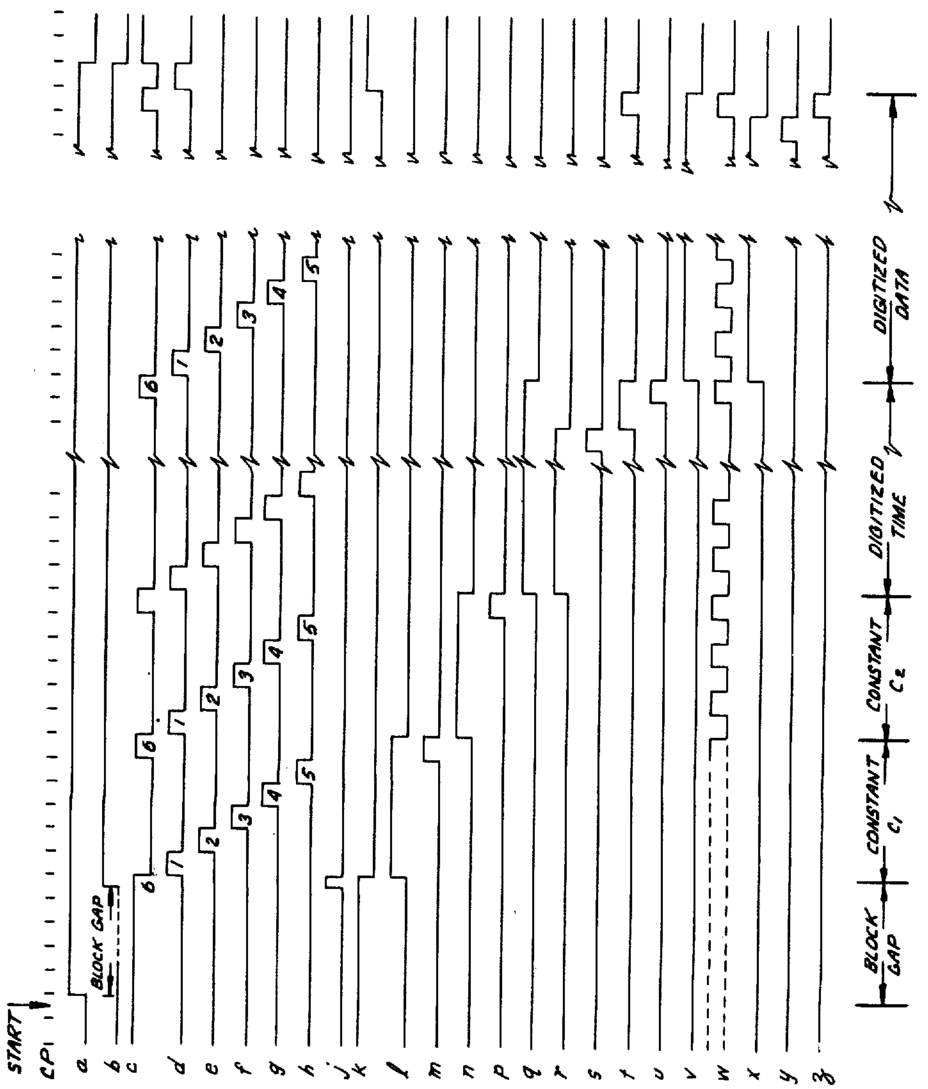
FIG. 9 is a series of waveforms useful in explaining the operation of the system.

After the block gap delay, the output of the "and" gate 56 opens a gate 70, passing clock pulses to the ring counter 64. Successive clock pulses advance the ring counter cyclically through five or six stable states, depending upon the setting of switches A–3 and A–4. When switch A–4 is closed, the fifth stable state is skipped, the ring counter going from the fourth state to the sixth state. However, when the switch A–3 is closed, the ring counter advances through all of its six stable states. The ring counter 64 continues to recycle as long as the gate 70 remains open. FIGS. 9(*c*) through (*h*) show the output waveforms on the six output lines from the ring counter 64 with the switch A–3 closed.

A flip-flop 67 provides means for determining alternate complete cycles of the ring counter 64, so that word lengths of ten or twelve digits may be provided. An "and" gate 69 senses the programmer action level, the initial condition of the ring counter 64, and the "on" state of the flip-flop 67. An "and" gate 71 senses the initial condition of the ring counter 64 and the "off" state of the flip-flop 67. As long as the programmer action level is high, the flip-flop 67 is alternately set and reset each time the counter 64 reaches its number six stable state.

When the programmer action level from the output of the "and" circuit 56 goes high, it also initiates the sequencing of the source counter circuit 32 which includes a skipping-type ring counter 72, indicated in FIG. 3, similar to the ring counter 64. The ring counter 72 has at least five stable states and is initially set to its first stable state, which is the standby condition for the source counter circuit, by means of a resetting level derived from an "or" gate 74. One of the inputs of the "or" gate 74 is the output of an inverter 76 to which is applied the programmer action level from the "and" gate 56. This insures that before the programmer action level goes high, the ring counter 72 is reset to its first stable state.

The ring counter 72 is advanced by clock pulses passed by a gate 78. These clock pulses advance the ring counter 72 through selected ones of its five possible stable states. Skipping of certain stable states is controlled by a Program switch indicated generally at 80, and a Constant switch indicated generally at 82. The Program switch has three positions for determining which of the abovementioned data sequence control operations are to be executed, namely, position 1 in which constants only are to be transferred to magnetic tape; position 2 in which time information and digitized data are to be transferred to magnetic tape; and position 3 in which constants, time information, and digitized data are to be transferred to magnetic tape during a single scan. The second and third stable conditions of the ring counter 72 establish the transfer of first and second constants to magnetic tape, the constants being designated respectively $C_1$ and $C_2$. The fourth stable state of the ring counter 72 establishers transfer of time information to the magnetic tape, and the fifth stable condition of the ring counter 72 establishes the transfer of digitized data to the magnetic tape.

The connections through bank A of the Program switch 80 in positions 1 and 3 causes the ring counter 72 to advance from the first stable to the second stable state in response to a clock pulse passed by the gate 78. However, the connections through bank A of the switch 80, when in position 2, cause the ring counter 72 to skip over the second and third stable states so as to advance directly from the first stable state to the fourth stable state in response to a clock pulse passsed by the gate 78. The Constant switch 82 can be set to cause transfer of either one constant, namely $C_1$, or two constants, namely, $C_1$ and $C_2$, to magnetic tape. With the switch 82 set in position 1, calling for a single constant $C_1$, bank B of switch 82 connects the output of the second stage of the ring counter 72 to position 1 of bank B of Program switch 80 and the number 3 position of bank E of the Program switch 80. Band B of switch 80 connects back to the input of the first stage of the ring counter 72, thereby causing the third, fourth and fifth stages to be skipped. Thus, with the constant switch 82 in position 1 and the Program switch 80 in position 1, the ring counter 72 is advanced from the first stable state to the second stable state and back again to the first stable state by successive clock pulses.

If the Program switch 80 is in position 3, bank E connects the output of the second stage of the ring counter to the fourth stage, thus skipping the third stage only. In this manner, only a single constant $C_1$ is transferred to magnetic tape before the ring counter 72 advances to the fourth stable state, initiating a transfer of time information to the magnetic tape.

With the switch 82 in its number 2 position, the output of the second stage of the ring counter 72 is connected through bank A to the input of the third stage of the ring counter 72, and the output of the third stage of the ring counter is connected through bank B of switch 82 to banks B and E of the Program switch 80. Thus, the ring counter 72, according to the setting of the Program switch 80, skips the fourth and fifth stages of the ring counter 72, causing only constants to be transferred to the magnetic tape, or advances through all stages of the ring counter 72, as desired.

The gate 78 is controlled by a logic circuit including an "or" gate 84 which is connected to the outputs of each of five "and" gates, indicated at 86, 88, 90 and 94, respectively. The first "and" gate 86 senses a number of conditions, namely, whether the ring counter 72 is in its initial or first stable state. It also senses whether the ring counter 64 is in its last or sixth stable state. It also senses, through a switch A–5 when closed, the condition of the double count flip-flop 67 to determine when the ring counter has completed an even number of cycles. Switch A–5, of course, is closed only for formats in which word lengths of ten or twelve digits are required. The "and" circuit 86 also senses the condition of a flip-flop 96. The function of this flip-flop is to store end-levels derived from the respective sources for indicating the completion of digital transfer from the particular source to magnetic tape. The flip-flop 96 is initially in its "off" state by virtue of a reset pulse RP and, in the reset condition, provides a high level to one input of the "and" gate 86. The programmer action level is also applied to the "and" circuit 86. When all conditions are satisfied, the output of the "and" gate 86 rises, causing the gate 78 to open and pass the next clock pulse to the ring counter 72. Normally, the rise of the programmer action level is the last condition to be satisfied on the input of the "and" gate 86 after the pressing of the Start button. The waveform on the output of the "and" gate 86 is indicated in FIG. 9*j*. The output waveform from the first stage of the ring counter 72 is indicated in FIG. 9*k*. Stepping of the ring counter 72 to its second stable state returns the output of the "and" gate 86 to a low level and, at the same time, initiates transfer of the first constant $C_1$ to the tape unit. The output waveform from the second stage is indicated in FIG. 9*l*.

Referring to FIG. 4, the circuit 10 for establishing the constants is shown in detail. This circuit preferably includes twelve decade switches which are manually set. Only one of the decade switches is shown, as indicated generally at 98. The decade switches are set according to the different digits of the constant to be transferred to magnetic tape. The first six switches, corresponding to the six digits of the first constant $C_1$, are successively energized in synchronism with the clock pulse source by means of an "and" gate matrix. The "and" gate matrix includes six "and" gates 100 which are connected to the output of the second stage of the ring counter 72. The six stages of the ring counter 64 are respectively connected to each of the six "and" gates 100. The $C_1$ line is raised to a high level by the ring counter 72 in its second stable state so that each of the "and" gate circuits 100 has its output raised to a high level as the ring counter 64 advances through its six stable states. A similar group of "and" gates 102 are biased open when the ring counter 72 is advanced to its third stable state, corresponding to constant $C_2$, each of the "and" gates 102 being connected respectively to the six outputs of the ring counter 64.

The decade switch 98 includes four banks which respectively set the levels on the four information lines corresponding to tracks #1, #2, #4 and #8 on the magnetic tape. These four information lines are coupled to the tape unit through the output circuit 20. The decade switch 98 can be set to any one of ten positions, and the resulting pattern on the four information lines corresponds to the binary representation of the decimal digit setting of the decade switch. As each of the "and" gates 100 is actuated by the stepping of the ring counter 64, each of the other associated decade switches establishes the proper levels on the four information lines to represent, in binary form, the setting of the respective decade switches. The levels on the four information lines, as applied to the tape unit 18 through the output circuit 20, cause the corresponding binary bits to be written on successive lines on the magnetic tape in synchronism with the clock pulse source. Writing information on magnetic tape in this manner is well known in the art and forms no part of the present invention.

When the ring counter 64 completes a cycle so that six digits of the constant $C_1$ are transferred to magnetic tape, the ring counter 72 is advanced to its third stable state. Stepping of the ring counter 72 to its third state is accomplished by the "and" gate 88 which senses that the ring counter 72 is in its second stable state. It also senses when the ring counter 64 is cycled back to its sixth stable state, at which time the output level from the "and" gate 88 goes high, opening the gate 78 through the "or" gate 84. The output of gate 88 is shown in the waveform of FIG. 9*m*. The next clock pulse passed by the open "and" gate 78 steps the ring counter 72 to its third stable state, assuming the constant switch 82 is set to position 2 for transfer of both constants $C_1$ and $C_2$. If the switch 82 is in position 1, the counter 72 skips the third state and $C_2$ is not transferred.

When the output level from the third stage of the ring counter 72 goes high, as indicated by the waveform in FIG. 9*n*, the next group of six constant switches are activated successively by the stepping of the ring counter 64. This is accomplished, as shown in the circuit of FIG. 4, by the second group of "and" gates 102. Thus, six more digits, representing constant $C_2$, are transferred to the magnetic tape.

When the ring counter 64 returns again to its sixth state, the ring counter 72 is advanced to its fourth stable state, initiating transfer of time information to the magnetic tape. The stepping of the ring counter 72 is accomplished by the "and" gate 90 which senses that the ring counter 72 is in its third state and senses when the ring counter 64 returns to its sixth state. The output waveform of gate 90 is shown in FIG. 9*p*. If both these conditions are true, the gate 78 is opened, passing a clock pulse to the ring counter 72, advancing it to its fourth stable state. The output waveform of the fourth stage of the counter 72 is shown in FIG. 9*q*.

Figure 5:
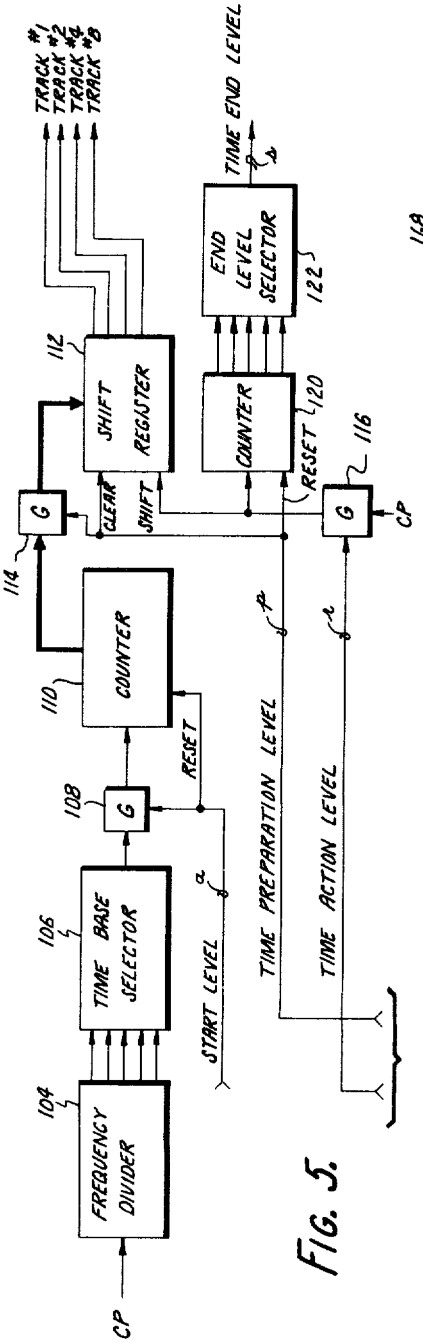
FIG. 5 is a detailed block diagram of the time information source.

The time accumulator 12, which is activated during the time the ring counter 72 is in its fourth state, is shown in detail in FIG. 5. Clock pulses from the source 22 are applied to a frequency divider 104 from which may be derived pulses at a number of different pulse repetition rates. A time base selector switch 106 is used to select any one of the repetition rates to provide a proper time base for the time accumulator.

Output pulses from the time base selector 106 are coupled by means of a gate 108 to a counter 110. The gate 108 is biased open by the start level (FIG. 9*a*) as derived from the output of the "or" gate 50 in the Start-Stop circuit 26 (see FIG. 2). Whenever the start level goes low, the counter 110 is reset to its zero count condition and starts recounting when the level goes high. Thus, the counter 110 provides a continuous indication of the elapsed time from the initial start of the data run. The counter 110, which may be a conventional binary-coded decimal type counter, is preferably arranged to have eight decades but may be expanded to more, depending on the desired number of time digits.

To effect time information readout without interfering with accumulation of time information in the counter 110, the count condition of the counter 110 is transferred to a shift register 112 through a gating circuit 114. The gating circuit 114 is open during one clock pulse interval by a time preparation level derived from the output of the "and" gate 86, the "and" gate 88 or the "and" gate 90. Referring to FIG. 3, the time preparation level applied to the time accumulator of FIG. 5 is derived from the bank C of the Program switch 80 which, in the number 2 position, is connected to the output of the "and" gate 86 and, in position 3, is connected to the bank C of the Constant switch 82. At bank C, the switch 82 selects the output of either the "and gate 88 or the "and" gate 90, depending upon whether one constant or two constants are to be recorded before time information on the magnetic tape. Since, in position 2 of the Program switch 80, no constants are to be transferred to the magnetic tape, the time preparation level is derived from the output of the "and" gate 86, which output also causes the ring counter 72 to advance from the first state directly to the fourth state. The waveform of the time preparation level is shown in FIG. 9*p*.

Where information is being recorded in binary-coded decimal form on the tape, the shift register 112 is arranged to shift out four binary bits in parallel as the register is shifted. Shifting of the register 112 is provided by shift pulses derived from the clock pulse source 22 and passed by the gate 116 which is biased open by a time action level. This time action level is derived from an "and" gate 118 in the format control circuit, as shown in FIG. 3. The "and" gate 118 senses that the flip-flop 96 is in its initial or reset condition and that the ring counter 72 is in its fourth state. During the time the time action level is high, binary-coded decimal digits representing time information, as derived from the counter 110, are shifted out of the register 112 by successive clock pulses. This information is recorded as magnetic bits on the appropriate tracks of the magnetic tape through the output circuit 20. The waveform of the time action level is shown in FIG. 9*r*.

After the desired number of time information digits have been transferred to the magnetic tape, a time end level, the waveform of which is shown in FIG. 9*s*, is derived from the time accumulator 12. As shown in FIG. 5, a counter 120 is provided which counts the shift pulses applied to the register 112. An end level selector circuit 122 is manually set to produce a high level at the output when the counter 120 reaches any preselected count condition.

The output of the end level selector 122 is used to set the flip-flop 96 when the desired number of time information digits have been transferred to the tape unit. This is accomplished by applying the time end level from the selector 122 through an "or" gate 124 in the format control circuit, as shown in FIG. 3. The output of the "or" gate 124 is applied to an "and" gate 126 which also senses that the output of the "or" gate 84 is at a low level through an inverter 128. Thus, the output of the "and" gate 126 goes high when the time end level changes, the output of the "and" gate 126 being applied to the flip-flop 96 whereby the next clock pulse sets the flip-flop to its set or "on" condition. As a result, the level applied to the "and" gate 118 goes low, causing the time action level to go low and closing the gate 116 in the time accumulator circuit. This stops further transfer of time digits from the register 112 to magnetic tape.

After the time information has been transferred to the magnetic tape, the ring counter 72 is advanced to its final stage for effecting transfer of digital information to magnetic tape. Stepping of the ring counter 72 is accomplished by the "and" circuit 92 which senses that the ring counter 72 is in its fourth state and senses that the ring counter 64 is in its sixth state. It also senses, when the switch A–5 is closed, the condition of the double count flip-flop 67, where ten or twelve digit words are required for the particular tape format. In addition, the "and" gate 92 senses the time end level at the output of the "or" gate 124. It also senses the condition of the flip-flop 96 through an "or" gate 130. The "or" gate 130, by sensing the flip-flop 96, continues to hold a high level on the "and" gate 92 after the time end level returns to a low level. Normally, the time end level remains high only during the interval between successive clock pulses, as shown in the waveform in FIG. 9*s*. FIG. 9*t* shows the output waveform for one side of the flip-flop 96.

When the "and" gate 92 output goes high, the gate 78 is biased open and the ring counter 72 is advanced to its fifth stable state. The waveform at the output of the "and" gate 92 is shown in FIG. 9*u*, and the waveform of the output of the last stage of the ring counter 72 is shown in FIG. 9*v*. As soon as the output of the "and" gate 92 goes high, the flip-flop 96 is reset. This is accomplished by means of an "and" gate 132 connected to one output of the flip-flop 96 and the output of the "or" gate 84.

Various soures of digital information may be available from which it is desired to transfer data to the magnetic tape. For example, the data may come from the decommutator at a PDM or PAM ground station, where information is sent from an airborne test station by a telemetering system. More commonly, the data is derived from a ground test station in which analog information is derived from a plurality of transducers associated with the test apparatus. The transducers convert pressures, temperatures, etc., to voltage levels, which are sampled by a commutator and digitized. Such an arrangement is described by way of example in connection with FIGS. 6 and 7.

Referring to FIG. 6 in detail, the commutator is preferably of the type described in Patent No. 2,864,075, which includes a low speed commutator section 134 having one hundred input channels, and a high speed commutator section 136 having preferably twenty input channels. These two sections combine to sample the voltage levels of analog input channels and apply the samples serially to a single output. The commutator is advanced by pulses applied to the high speed commutator through a gate 138 to which a commutator action level is applied. The low speed commutator 134 is controlled by pulses generated by the high speed commutator section after five, ten, fifteen and twenty step pulses are applied thereto. The high speed commutator recycles after twenty step pulses. The stepping pulses applied to the commutator through the gate 138 are derived from the digitizer 14, as described hereinafter in connection with FIG. 7.

The commutator action level is derived from an "and" gate 140, as shown in FIG. 3. The "and" gate 140 is responsive to the level from the last stage of the ring counter 72 and, when a switch A–20 is closed, to the condition of the flip-flop 96. For certain formats, a third level may be applied to the "and" gate 140 through a switch A–9, the level being derived in a manner and for a purpose to be hereinafter described in detail. Either, but not both, of the switches A–9 or A–20 is closed for all formats. The waveform of the commutator action level is shown in FIG. 9*x*.

Figure 7:
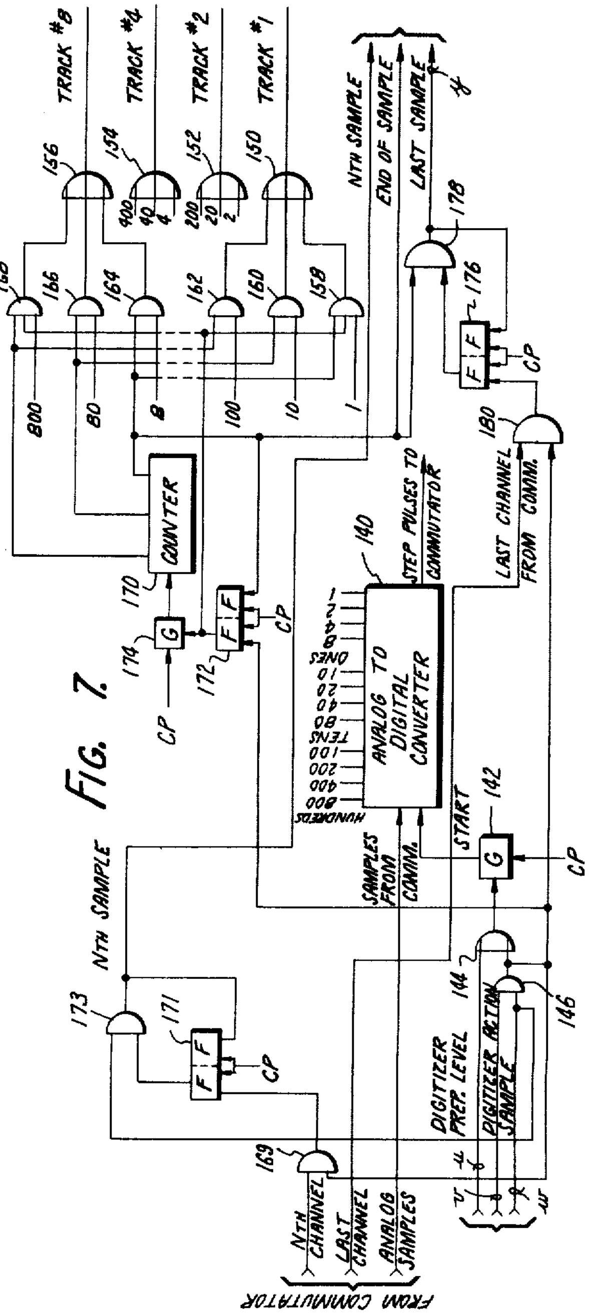
FIG. 7 shows a block diagram of a digitizer for use in conjunction with the commutator of FIG. 6.

The analog samples derived from the output of the commutator 16 are applied to an analog digital converter 140 in the digitizer 14, as shown in FIG. 7. The converter 140 is preferably of the type known as a feedback encoder, such as described in the book, Digital Computer Components and Circuits, by R. K. Richards, page 488, published by D. Van Nostrand Company, Inc., 1957. The converter may be weighted to produce a straight binary-coded digital output, or may be weighted to produce a binary-coded decimal output, as desired. For binary-coded decimal operation, the converter includes three decades corresponding to the hundreds, tens and units decimal digits, each decade including four flip-flops which are weighted according to the 1-2-4-8 binary code. When a clock pulse is applied to the converter 140, the converter is automatically cleared and the existing sample level on the input to the converter automatically sets up the proper levels on the output lines from the several decades in the equivalent binary-coded decimal representation. The converter 140 operates at a much higher speed than the clock pulse rate of the source 22, so that complete conversion takes place readily between successive clock pulses. At the completion of the analog-to-digital conversion of an input sample voltage by the converter 140, a pulse is generated at the output of the converter which is used to step the commutator 16 through the gate 138. See FIG. 6. This produces the next sample level at the input of the converter.

Recycling pulses are applied to the converter 140 by means of clock pulses passed by a gate 142. The gate 142 is biased open by either a digitizer preparation level from the output of the "and" gate 92 of the format control circuit, as shown in FIG. 3, or by the simultaneous presence of a digitizer action level and a sample level. This is accomplished by applying the digitizer action level and the sample level to an "and" gate 146, the output of which is applied to the gate 142 through the "or" gate 144 along with the digitizer preparation level.

The digitizer action level is derived from the last stage of the ring counter 72 and has the waveform shown in FIG. 9*v*.

The sample level is derived from an "or" gate 148, shown in FIG. 2. Inputs to the "or" gate 148 are derived from the ring counter 64 through any one or more of switches A–16, A–17, A–18 and A–19. The "or" gate 148 may also be coupled through a switch A–15 to a sampling end level derived from the digitizer 14. By appropriate setting of the switches on the input of the "or" gate 148, the number of samples per word can be controlled. For example, if switch A–19 is closed, one sample per five or six digit word is digitized and transferred to magnetic tape. If switch A–17 and switch A–19 are both closed, two samples are provided for each six digit word on tape. Switch A–15 is used for continuous operation in which a new sample is started immediately following the end of the previous sample. A typical waveform for the sample level, assuming switches A–16, A–18 and A–19 are closed, is shown in FIG. 9w.

Special output logic is required to transfer the digital information from the converter 140 to the output circuit 20 for transfer to the tape unit 18. This logic varies, depending upon whether the converter 140 is arranged to produce a straight binary output, a binary-coded decimal output with sign, or a binary-coded decimal output without sign. The latter arrangement is shown by way of example in FIG. 7. This output logic includes four "or" gates 150, 152, 154 and 156. The output levels from these four "or" gates are used to magnetize the #1, #2, #4 and #8 tracks of the magnetic tape through the output circuit 20. Each of the "or" gates has three inputs which, in the case of the "or" gate 150, are derived from three "and" gates 158, 160 and 162, and in the case of the "or" gate 156 are derived from three "and" gates indicated at 164, 166 and 168. Inputs to the "or" gates 152 and 154 are similarly derived from groups of three "and" gates, which have not been shown in FIG. 7 for the sake of simplicity. The most significant bit output from each of the three decades in the converter 140 is applied respectively to the three "and" circuits 164, 166 and 168. Similarly, the three least significant bit lines from the three decades of the converter 140 are applied respectively to the gates 158, 160 and 162. The other two bit lines are similarly arranged in the output logic circuit.

In order that the three decimal digits may be transferred to the magnetic tape in sequence starting with the most significant digit and ending with the least significant digit, a counter 170 is provided. When the output of the "and" gate 146 calls for a sample, a flip-flop 172 is set by the next clock pulse so as to open a gate 174. With the gate 174 open, clock pulses are applied to the counter 170 to count it through its three counting states, thereby applying a high level to each of the three "and" gates in succession associated with each of the "or" gates 150, 152, 154 and 156.

The same level from the flip-flop 172 that is applied to the gate 174 is applied to all of the "and" gates in the output logic, so that digits can only be transferred out of the digitizer 14 when a sample has been called for. When the counter 170 advances to its third count condition, it produces an end of sample level which is applied to the flip-flop 172. Unless a new sample is called for, the counter is reset to an initial standby count condition. The end of sample level from the counter 172 is also applied, if needed for continuous operation, through the switch A–15 to the "or" gate 148 of FIG. 2.

A high level output from the digitizer may be generated after a selected number of samples. This output level is referred to as the Nth sample level. It is produced in response to the Nth channel signal output of the commutator circuit of FIG. 6. This level goes high after ten, fifteen, and/or twenty counts of the high speed commutator section 136, depending on the setting of the switches A–12, A–13 and A–14. The Nth channel signal is applied along with the output of "and" gate 146 to an "and" gate 169. When the output of the "and" gate 169 goes high, a flip-flop 171 is set by the next CP. This results in a high level being applied to an "and" gate 173. The sample level is also applied to the "and" gate 173, the output of which is the Nth sample level. This level is used to reset the flip-flop 171 and is used by the format control circuit of FIG. 3 in a manner hereinafter explained.

In normal operation, digitizing may continue until the last sample is read out to magnetic tape. The last sample is established by means of a flip-flop 176 which normally applies a low level to an "and" gate 178. The last stage of the counter 170 is also applied to the "and" gate 178. When the last channel is sampled by the commutator 16, a high level is derived from a last channel signal output from the commutator. This is applied to an "and" gate 180 in the digitizer along with the output of the "and" gate 146. Thus, when the last sample is called for on the last channel of the commutator, the flip-flop 176 is set so as to provide a high level to the "and" gate 178.

When the counter 170 is advanced to its last stage and the last digit is transferred to the tape, the output level of the "and" gate 178 is high, providing a last sample level. This level is applied to the flip-flop 176 for resetting it to its initial condition. This level is applied to the "or" gate 124 in the format control circuit, as shown in FIG. 3. It thereby functions to operate the flip-flop 96 in the same manner as at the end of digitized time information transfer to the tape unit, described above.

An "and" gate 94 in the format control circuit, as shown in FIG. 3, senses when the ring counter 72 is in its fifth stable state, senses the output of the "or" gate 130, and senses the sixth count condition of the ring counter 64. When these three levels go high, the output level of the "and" gate 94 goes high, opening the gate 78 and returning the ring counter 72 back to its initial count condition. At the same time, the flip-flop 96 is reset through the "and" gate 132.

For single scan operation or periodic scan operation, as determined by the setting of the time mode switch 42, the tape unit is stopped after the last character of digitized data has been transferred. To this end, the output of the "and" gate 94 is applied to the D bank of the Time Mode switch 42 through an "or" gate 182 and an "or" gate 184. The output of the "or" gate 182 is also applied to one side of a flip-flop 186. When set, the flip-flop 186 applies a high level to the "or" gate 184. Thus, until the flip-flop 186 is reset, a high level is continuously applied to the D bank of the switch 42.

With the switch 42 set in position 1 or 2, corresponding to single scan or periodic scan operation, a high level is derived from the output of the D bank which is applied through an "or" gate 188 to an "and" gate 190. The "and" gate 190 is also connected to the reset side of the flip-flop 48. As a result, the next clock pulse resets the flip-flop 48, providing a low level to the "or" gate 50. The flip-flop 186 is also connected to the "or" gate 50, and its existing condition provides a low level thereto. Also, the output of the "and" gate 40 is low. As a result, the output of the "or" gate 50 at this time goes low, which stops the tape unit drive and opens the gate 54 for resetting all the flip-flops in the format control circuit. The circuit remains in standby operation until the start button 38 is again pressed, or the interval timer 46 starts a new scan.

In the case of continuous operation, with the switch 42 set in its position 3, the flip-flop 48 will remain unchanged, and the level at the output of the "or" gate 50 will remain high. Thus, there is no interruption in the tape drive unit. As a result, the ring counter 72 is advanced by the next clock pulse to its second count condition and the whole cycle is repeated. However, it may be desirable to introduce a block gap on the magnetic tape at this point to separate the cycles into separate blocks on the magnetic tape. This may be provided by means of a switch A–1, as shown in FIG. 2, which, when closed, connects the output of the "or" gate 182 through an "or" gate 192 to an "and" gate 194. One side of the flip-flop 58 in the block gap circuit 28 is also applied to the "and" gate 194. As a result, the output of the "and" gate 194 goes high, causing the flip-flop 58 to be reset. This, of course, causes the output of the "and" gate 56 to go low until the one-shot multivibrator 60 goes through its cycle in the manner described above. Thus, the programmer action level from the output of the "and" gate 56 goes low for a predetermined interval corresponding to the block gap interval. This introduces a space on the magnetic tape before the next cycle of the ring counter 72 is initiated.

Operation of the programming circuit can be interrupted any time by means of a stop switch 196 in the start-stop circuit 26, as shown in FIG. 2. When the stop switch is closed, it applies a high level to the "or" gate 188 so as to reset the flip-flop 48. With the switch 42 in its position 2, corresponding to periodic scan, the stop switch 195, when closed, resets the interval timer 46. Where the program switch 80 is in position 1, calling for constants only, the output of D bank of the switch 80 is also connected to the "or" gate 182, as shown in FIG. 2. Thus, after one or two constants have been transferred, depending upon the setting of the constant switch 82, the tape unit is automatically stopped for single scan or periodic scan operation, or a block gap may be introduced by means of switch A–1 in continuous operation.

It will be appreciated from the circuit as described thus far, that the programmer action level, as derived from the output of the "and" gate 56 of the block gap circuit 28, returns to a low level whenever the stop button is pressed, at the end of a complete cycle for single scan or repetitive operation, or by introducing a block gap at the end of each cycle of the counter 72 in continuous scan operation.

The commutator 16 may be reset at this time. This is accomplished by means of switch A–22, as shown in FIG. 3. Switch A–22 connects the output of the inverter 76, to which the programmer action level is applied, to the commutator reset input. Thus, when the programmer action level goes low, the output of the inverter 76 goes high, resetting the high speed and low speed commutators to their initial settings.

For other formats, it is desirable to reset the commutator only at the end of the test run, such as when the tape drive unit is stopped. In such cases, switch A–21 is closed rather than switch A–22. This connects the commutator reset to the tape start level derived from the output of the "or" gate 50 of FIG. 2, and having the waveform shown in FIG. 9*b*. An inverter 200 is inserted in series with the switch A–21 so that when the level to the drive unit goes low, the reset level applied to the commutator through the switch A–21 goes high.

The number of samples of digitized data to be included in a block varies depending on the tape format required for use with a particular piece of data processing equipment. For example, where the information on tape is ultimately to be transferred to IBM punch cards, the block length on tape is made to correspond to the storage capability of one card. Constants and time information are repeated in each block, as set by means of the program selector switch 80. An IBM card can store up to eighty characters. If binary-coded decimal information is being recorded without sign information, a sample is limited to three digits. If eighteen characters are used to record time and constants, sixty-two characters may be used for recording data on each IBM card. Twenty samples per block would require sixty characters. Therefore, twenty complete samples is the maximum that could be used.

If binary-coded decimal information with sign is being recorded, four characters are required per digitized sample. Thus, only one sample per word is possible, and if a word length is six characters on tape, a maximum of ten samples is permissible for this format. Thus, it will be apparent that each format may have a particular number of samples per block.

The number of samples per block is controlled by means of the Nth sample level derived from the digitizer circuit of FIG. 7. This Nth sample level may be used to start a new cycle after a selected number of samples by resetting the ring counter 72 through the "or" gate 74. The Nth sample level is connected in some formats through a switch A–6, shown in FIG. 3. With this switch closed, the ring counter 72 is reset after ten, fifteen or twenty samples have been digitized, depending upon which of switches A–12, A–13 and A–14, in the commutator circuit of FIG. 6, is closed. The output from the switch A–6 is also coupled to the "or" gate 192, shown in FIG. 2, through a switch A–2. The Nth sample level coupled through the closed switches A–6 and A–2 resets the block gap circuit 28 when the level goes high.

Some formats require more than twenty samples per block. For instance, the format for the IBM 650 magnetic tape system requires a hundred samples per block. Remington Rand punch cards may require thirty samples per block. Such formats are accommodated by a sample counter 34, shown in FIG. 3, which is preferably a three-stage binary counter which is advanced by clock pulses passed by a gate 206. The Nth sample level is applied to the gate 206, so that the sample counter 34 can be advanced after ten, fifteen or twenty samples, as the case may be.

To produce a block gap after a hundred samples, the last stage of the sample counter 34 and the Nth sample level are applied to an "and" gate 208. The output of the "and" gate 208 is connected through a switch A–8 to the "or" gate 74 for resetting the ring counter 72. The output of the "and" gate 208 is also applied to the block gap circuit 26. It will be appreciated that if the Nth sample level goes high after twenty samples have been digitized, the output of the "and" gate 208 goes high after the fifth pulse is passed by the gate 206, corresponding to completion of a hundred digitized samples.

To produce a block gap after thirty samples, for example, the first and last stages of the sample counter 34 are applied to an "and" gate 210. The output of the "and" gate 210 is connected through a switch A–7 to the "or" gate 74 for resetting the ring counter 72 and to actuate the block gap circuit 26. The switches A–12 and A–14 are closed so that the Nth sample level goes high after ten, twenty, thirty, forty, etc., samples have been digitized. The output of the "and" gate 210 does not go high until three pulses have been applied to the sample counter 34, corresponding to a total of thirty samples. Many other combinations are possible for controlling the number of samples per block using the Nth sample level and the sample counter 34.

For the Remington Rand type punch card operation, a full set of 120 characters must be provided per block. Constants and time information are repeated in each block. Preferably three words, totalling eighteen characters, are used for time and/or constants, leaving 108 characters for digitized data. However, with three characters per sample being used and thirty samples per block, only ninety of 108 characters are used per block. The digitizer must be stopped after thirty samples, but the block gap cannot be inserted until twelve more clock intervals to make a full block length of 120 characters on tape.

To this end, two additional inputs are applied to the "and" gate 210 derived from the sixth count stage of the ring counter 64 and the flip-flop 67. The output of the "and" gate 210 does not go high after thirty samples, but is thereby delayed until the ring counter 64 completes an even number of cycles. The sample counter 34 provides two high input levels after eighteen words, i.e., after three words of time and/or constants plus fifteen words or thirty sample of digitized data. The word counter 64 has to complete two more cycles, making twenty words or 120 characters total, before the output of the "and" gate 210 goes high and a block is completed.

After thirty samples, the commutator and digitizer must be stopped, however. This is accomplished by sensing the condition of the first and second stages of the binary counter 34 through inverter circuits 220 and 222. The inverter 220 output is connected through a switch A–10 to an "or" gate 224 along with the output of the inverter 222 output. A switch A–9 connects the output of the "or" gate 224 to the "and" gate 140. The level applied to the "and" gate 140 remains high until the sample counter 34 has been counted three times, i.e., there have been thirty samples digitized. This level then goes low, as does the commutator action level output of the "and" gate 140. Thus, further sampling and digitizing is stopped after the thirty samples.

Switches A–1 through A–22 may be conveniently made part of a single plugboard by a simple rearrangement of the plugboard pattern. The format programming circuit can be arranged to produce any one of a number of predetermined formats. FIG. 10 shows a "truth table" for the plugboard switches for several representative formats. An X indicates that a particular switch is closed for that format, while a zero indicates that a particular switch is open for that format.

For example, the first format shown is for use with the IBM 704 computer using a binary-coded decimal notation with three digits per sample of digitized data. In this format, the switch A–1 is closed so that a block gap is inserted at the end of a completed scan. Switch A–2 is open because there is no limit on the number of samples per block in this format. Switch A–3 is closed because the format requires six characters per word. For the same reason, switches A–4 and A–5 remain open. Switches A–6 through A–11 control the number of samples per block. Accordingly, for this format, none of these switches are closed. Switches A–12 through A–14 also relate to the number of samples per block so these switches are all open.

Since each sample has three digits for this format, there can be two samples for each six-digit word. Thus, switches A–17 and A–19, from which the sampling level is derived from the ring counter 64, are closed. Also, the commutator is not reset until all channels have been scanned and a block gap is inserted.

The next format shown in the "truth table" also is compatible with the IBM 704 computer. It differs in that binary-coded decimal notation plus sign is required so that there are four digits per sample. The only change needed to effect this format is the opening of the switch A–17, permitting only one sample per word.

The third format is similar to the first two formats in that it is compatible with the IBM 704 computer. At the same time, this format is designed to arrange information in blocks so as to be compatible with IBM punch card equipment. In this format, the switch A–2 is closed in addition to the switch A–1 so as to insert a block gap every time the ring counter 72 is reset to start a new cycle. Also, the switch A–6 is closed so that the ring counter 72 is recycled. Switch A–14 is closed so that twenty samples of digitized data are provided for each block. Switch A–21 is closed rather than switch A–22 so that the commutator is reset only after the tape unit is stopped. In other words, the commutator continues to sample successive inputs from block to block and is not reset for each block.

Where information is to be transferred only to IBM punch card equipment and need not be compatible with the 704 computer, continuous operation may be provided instead of dividing the samples into words. This is illustrated by the fourth format of FIG. 8. For example, if four digits are required for sample, the switch A–13 is closed so that a block gap is inserted after fifteen samples. At the same time, the switch A–15 is closed so that the new sample is started after completion of a previous sample.

For the IBM 650 computer, word lengths of ten characters are required, with sixty words per block. For this reason, the switches A–4 and A–5 are closed, providing word lengths of ten characters. Switches A–8 and A–14 are closed to provide a block gap after one hundred samples (fifty words of digitized data) have been transferred to magnetic tape. Switch A–19 is closed to provide one sample per cycle on the ring counter 64, thus providing two digitized samples per ten character word on tape.

The next format shown in FIG. 8 is for operation with the Remington Rand 1103 punch printer and has already been discussed in some detail above. It provides block lengths of 120 characters with thirty samples of digitized data, plus three words of time and/or constants.

The last format shown in FIG. 8 is for continuous operation. This format provides maximum density on tape through continuous transfer of data to the tape. It is not compatible with any exisitng computer equipment.

The above formats are representative of the various formats which can be programmed by the present invention. A number of other formats are also available by various combinations of the above enumerated switches set forth in FIG. 8. Arranging the switches as a plugboard makes it easy to set up any desired format. By setting of the switches 42, 80 and 82, digitized data can be laid down on magnetic tape in a variety of patterns, so as to be compatible with most of the presently known data processing systems using magnetic tape input.

What is claimed is:

1. Apparatus for recording a number of analog input channels of information in digitized form on magnetic tape, the apparatus comprising means for recording binary coded digits on magnetic tape, commutating means for successively sampling the input channels, digitizing means coupled to the output of the commutating means for converting the voltage level of each channel sample to a group of data digits in binary coded form for direct recording on tape, time accumulator means for continuously indicating elapsed time by a group of time digits in binary coded form for direct recording on tape, a word counter for cyclically counting the number of digits transferred to the magnetic tape to determine when a complete word has been transferred to tape, a source counter for cyclically activating in successive count conditions the time accumulator means, and the commutating and digitizing means, means for sensing the counting of a complete cycle of the word counter and the count condition of the source counter for advancing the source counter to the condition for activating the time accumulator means to transfer time digits serially to the magnetic tape recording means, means responsive to the completion of a cycle of the word counter, the count condition of the source counter, and the transfer of the last of said group of time digits to magnetic tape for advancing the source counter to the condition for activating the commutating and digitizing means, means responsive to the word counter for advancing the commutating means at selected intervals in synchronism with the counting of the word counter, means responsive to the advancing of the commutating means for sensing the number of said input channels that are sampled, and means for periodically recycling the source counter following a predetermined number of sampled input channels, the number of input channels sampled being preset as desired.

2. Apparatus for recording a number of analog input channels of information in digitized form on magnetic tape, the apparatus comprising means for recording binary coded digits on magnetic tape, commutating means for succesively sampling the input channels, digitizing means coupled to the output of the commutating means for converting the voltage level of each channel sample to a group of data digits in binary coded form for direct recording on tape, time accumulator means for continuously indicating elapsed time by a group of time digits in binary coded form for direct recording on tape, a word counter for cyclically counting the number of digits transferred to the magnetic tape to determine when a complete word has been transferred to tape, a source counter for cyclically activating in successive count conditions the time accumulator means, and the commutating and digitizing means, means for sensing the counting of a complete cycle of the word counter for advancing the source counter to the condition for activating the time accumulator means to transfer time digits serially to the magnetic tape recording means, means responsive to the completion of a cycle of the word counter and the transfer of the last of said group of time digits to magnetic tape for advancing the source counter to the condition for activating the commutating and digitizing means, means responsive to the word counter for advancing the commutating means at selected intervals in synchronism with the counting of the word counter, means responsive to the advancing of the commutator for sensing the number of samples digitized, and means for periodically recycling the source counter following a predetermined number of channel samples, the number of samples being preset as desired.

3. Apparatus for recording digitized information from a plurality of digitized information sources on magnetic tape according to any one of a number of different formats, said apparatus comprising a clock pulse source, a settable word counter including means for presetting the word counter to recycle in response to a selected number of counting pulses, means for advancing the word counter in response to clock pulses, a settable source counter for successively activating selected ones of said plurality of digitized information sources with advance of the source counter, means responsive to a particular count condition of the word counter and the existing condition of the source counter for advancing the source counter to the next desired count condition to activate another of said sources after the desired data is transferred from a given source to magnetic tape, whereby selected ones of said sources are activated in succession for intervals corresponding to an integral number of cycles of the word counter, and means for transferring digital information to the magnetic tape from each of the sources when it is activated by the source counter, said sources and transferring means being synchronized with the clock pulse source, whereby one digit is transferred to tape with each clock pulse.

4. Apparatus for recording digitized information from a plurality of digitized information sources on magnetic tape according to any one of a number of different formats, said apparatus comprising a clock pulse source, a settable word counter, means for advancing the word counter in response to clock pulses, a settable source counter for successively activating selected ones of said plurality of digitized information sources with advance of the source counter, means responsive to a particular count condition of the word counter for advancing the source counter to the next desired count condition to activate another of said sources after the desired data is transferred from a given source to magnetic tape, whereby selected ones of said sources are activated in succession for intervals corresponding to an integral number of cycles of the word counter, and means for transferring digital information to the magnetic tape from each of the sources when it is activated by the source counter, said sources and transferring means being synchronized with the clock pulse source, whereby one digit is transferred to tape with each clock pulse.

5. Apparatus for recording digital information from a plurality of sources on magnetic tape according to any one of a number of preset formats, said apparatus comprising a source of preset digitized characters representing constants in electrically coded form, a source of time information in digitized electrically coded form, a source of data in digitized electrically coded form, a recycling word counter, means for presetting the number of count conditions through which the word counter can be stepped in a complete cycle, a recycling source counter having a plurality of count conditions, there being a count condition corresponding to each of the several sources of digitized information, a synchronizing clock pulse source, a multichannel output circuit for transferring electrically coded bits representative of digitized information to the magnetic tape, a group of bits representing one digital character being transferred to a corresponding number of tracks on the tape simultaneously to form one character line on the tape, means for advancing the word counter in response to clock pulses, means for activating the constants source, the time information source, and the data source in that order with the advancing of the source counter through its plurality of count conditions, first means for advancing the source counter to the count condition to activate the constants source including means responsive to an initial count condition of the word counter, first means synchronized with the clock source for transferring the digitized characters from the constants source to the output circuit for writing on tape, second means for advancing the source counter to the count condition to activate the time information source including means responsive to said initial count condition of the word counter and the transfer of all the digits from the constants source to the tape, second means synchronized with the clock pulse source for transferring time information digits from the time information source to the output circuit for writing on tape, third means for advancing the source counter to the count condition to activate the data source including means responsive to said initial count condition of the word counter and the transfer of all the digits from the time information source to the tape, third means synchronized with the clock pulse source for transferring data digits from the data source to the output circuit for writing on magnetic tape, and means responsive to the word counter for controlling the number of digits transferred from the data source to magnetic tape during one complete cycle of the word counter.

6. Apparatus for recording digital information from a plurality of sources on magnetic tape according to any one of a number of preset formats, said apparatus comprising a source of preset digitized characters representing constants in electrically coded form, a source of time information in digitized electrically coded form, a source of data in digitized electrically coded form, a recycling word counter, a recycling source counter having a plurality of count conditions, there being a count condition corresponding to each of the several sources of digitized information, a synchronizing clock pulse source, an output circuit for transferring electrically coded bits representative of digitized information to the magnetic tape, means for advancing the word counter in response to clock pulses, means for activating the constants source, the time information source, and the data source in succession with the advancing of the source counter through its plurality of count conditions, first means for advancing the source counter to the count condition to activate the constants source including means responsive to an initial count condition of the word counter, first means synchronized with the clock source for transferring the digitized characters from the constants source to the output circuit for writing on tape, second means for advancing the source counter to the count condition to activate the time information source including means responsive to said initial count condition of the word counter and the transfer of all the digits from the constants source to the tape, second means synchronized with the clock pulse source for transferring time information digits from the time information source to the output circuit for writing on tape, third means for advancing the source counter to the count condition to activate the data source including means responsive to said initial count condition of the word counter and the transfer of all the digits from the time information source to the tape, third means synchronized with the clock pulse source for transferring data digits from the data source to the output circuit for writing on magnetic tape, and means responsive to the word counter for controlling the number of digits transferred from the data source to magnetic tape during one complete cycle of the word counter.

7. Apparatus for recording digital information from a plurality of sources on magnetic tape according to any one of a number of preset formats, said apparatus comprising a source of time information in digitized electrically coded form, a source of data in digitized electrically coded form, a recycling word counter, a recycling source counter having a plurality of count conditions, there being a count condition corresponding to each of the several sources of digitized information, a synchronizing clock pulse source, an output circuit for transferring electrically coded bits representative of digitized information to the magetic tape, means for advancing the word counter in response to clock pulses, means for activating the time information source and the data source with the advancing of the source counter through its plurality of count conditions, first means for advancing the source counter to the count condition to activate the time source including means responsive to said initial count condition of the word counter, first means synchronized with the clock pulse source for transferring time digits from the time information source to the output circuit for writing on tape, second means for advancing the source counter to the count condition to activate the data source including means responsive to said initial count condition of the word counter and the transfer of all the digits from the time information source to the tape, second means synchronized with the clock pulse source for transferring data digits from the data source to the output circuit for writing on magnetic tape, and means responsive to the word counter for controlling the number of digits transferred from the data source to magnetic tape during one complete cycle of the word counter.

8. Apparatus for recording digital information from a plurality of sources on magnetic tape according to any one of a number of preset formats, said apparatus comprising a source of time information in digitized electrically coded form, a source of data in digitized electrically coded form, a recycling word counter, a recycling source counter having a plurality of count conditions, there being a count condition corresponding to each of the several sources of digitized information, a synchronizing clock pulse source, an output circuit for transferring electrically coded bits representative of digitized information to the magnetic tape, means for advancing the word counter in response to clock pulses, means for activating the time information source and the data source with the advancing of the source counter through its plurality of count conditions, first means for advancing the source counter to the count condition to activate the time information source including means responsive to said initial count condition of the word counter, first means synchronized with the clock pulse source for transferring time digits from the time information source to the output circuit for writing on tape, second means for advancing the source counter to the count condition to activate the data source including means responsive to said initial count condition of the word counter and the transfer of all the digits from the time source to the tape, and second means synchronized with the clock pulse source for transferring data digits from the data source to the output circuit for writing on magnetic tape.

9. Apparatus for recording digital information from a plurality of sources on magnetic tape according to any one of a number of preset formats, said apparatus comprising a plurality of digital sources for producing binary coded information including a source of accumulated digitized time information and a source of digitized data samples, means for transferring binary coded information serially from selected ones of said digital sources to magnetic tape, a recycling word counter, means for successively activating said plurality of digital sources in synchronism with a recycling of the word counter, whereby each source is activated for an integral number of cycles of the word counter, means responsive to the word counter when the data source is activated for controlling the number of digitized data samples transferred to magnetic tape during one cycle of the word counter, sample counting means for counting the number of digitized data samples transferred to magnetic tape, block gap means responsive to said sample counting means for interrupting any transfer of information to the tape from any source for a fixed time interval following the transfer of a selected number of digitized data samples to the tape, and means for reactivating the accumulated time information source before again reactivating the data source, whereby digitized time information and a group of digitized data samples are recorded successively on tape in blocks separated by block gaps formed by said block gap means.

10. Apparatus as defined in claim 9 wherein the source of digitized data samples includes means for deriving data samples from a plurality of inputs in sequence, and means responsive to the block gap means for resetting the sample deriving means to recycle the same group of inputs during successive transfer periods from the data source to the magnetic tape.

11. Apparatus for recording digital information from a plurality of sources on magnetic tape according to any one of a number of preset formats, said apparatus comprising a plurality of digital sources for producing binary coded information including a source of accumulated digitized time information and a source of digitized data samples, means for transferring binary coded information serially from selected ones of said digital sources to magnetic tape, a recycling word counter, means for successively activating said plurality of digital sources in synchronism with a recycling of the word counter, whereby each source is activated for an integral number of cycles of the word counter, means responsive to the word counter when the digitized data source is activated for controlling the number of digitized data samples transferred to magnetic tape during one cycle of the word counter, means for counting the number of digitized data samples transferred to magnetic tape, and means for reactivating the accumulated time information source after a predetermined number of data samples have been transferred to magnetic tape to transfer time information to the tape after each group of data samples has been transferred to tape.

12. Apparatus for recording digital information from a plurality of sources on magnetic tape according to any one of a number of preset formats, said apparatus comprising a plurality of digital sources for producing binary coded information including a source of accumulated digitized time information and a source of digitized data samples, means for transferring binary coded information serially from selected ones of said digital sources to magnetic tape, a recycling word counter, means for successively activating said plurality of digital sources in synchronism with a recycling of the word counter, whereby each source is activated for an integral number of cycles of the word counter, means for counting the number of digitized data samples transferred to magnetic tape, block gap means responsive to said sample counting means for interrupting any transfer of information to the tape from any source for a fixed time interval following the transfer of a selected number of digitized samples to the tape, and means for reactivating the accumulated time information source following operation of the block gap means before again reactivating the data sample source, whereby digitized time information and a group of digitized data samples are recorded successively on tape in blocks separated by block gaps formed by said block gap means.

13. Apparatus for recording digital information from a plurality of sources on magnetic tape according to any one of a number of preset formats, said apparatus comprising a plurality of digital sources for producing binary coded information including a source of accumulated digitized time information and a source of digitized data samples, means for transferring binary coded information serially from selected ones of said digital sources to magnetic tape, a recycling word counter, means for successively activating said plurality of digital sources in synchronism with a recycling of the word counter, whereby each source is activated for an integral number of cycles of the word counter, means for counting the number of digitized data samples transferred to magnetic tape, and means for reactivating the accumulated time information source after a predetermined number of data samples have been transferred to magnetic tape to transfer time information to the tape after each group of data samples has been transferred to tape.

14. Apparatus for recording a number of analog input channels of information in digitized form on magnetic tape, the apparatus comprising means for recording binary bits in lines on magnetic tape, commutating means for successively sampling the input channels, digitizing means coupled to the output of the commutating means for converting the voltage level of each channel sample to a group of data digits in binary coded form for direct recording on tape, time accumulator means for indicating elapsed time by a group of time digits in binary coded form for direct recording on tape, manually settable means for generating a predetermined group of digits representing constants in binary coded form for direct recording on tape, a word counter for cyclically counting the number of digits transferred to the magnetic tape to determine when a complete word has been transferred to tape, a source counter for cyclically activating in successive count conditions the constants generating means, the time accumulator means, and the commutating means and digitizing means, means controlled by the word counter for transferring the constants digits to the magnetic tape when the constants generating means is activated by the source counter, means for sensing the counting of a complete cycle of the word counter and the count condition of the source counter for advancing the source counter from the activating condition for the constants generating means to the activating condition for the time accumulator means, means controlled by the word counter for transferring said group of time digits from the time accumulator means to magnetic tape when the time accumulator means is activated by the source counter, means responsive to the completion of a cycle of the word counter, the count condition of the source counter, and the transfer of the last digit of said group of time digits to the magnetic tape for advancing the source counter to the activating condition for the commutating means and the digitizing means, means responsive to the word counter for advancing the commutator means to initiate digitized samples at selected intervals in synchronism with the counting of the word counter, said commutator advancing means including means for selecting the number of samples initiated during one cycle of the word counter, means responsive to the advancing of the commutating means for sensing the number of samples digitized, means for periodically recycling the source counter following a predetermined number of samples, the number of samples being preset as desired, and time delay means for interrupting the word counter for a delay interval following the last of said predetermined number of samples while the tape is running to insert a block gap on the tape after the predetermined number of samples have been digitized and transferred to tape.

15. Apparatus for recording a number of analog input channels of information in digitized form on magnetic tape, the apparatus comprising means for recording binary bits in lines on magnetic tape, commutating means for successively sampling the input channels, digitizing means coupled to the output of the commutating means for converting the voltage level of each channel sample to a group of data digits in binary coded form for direct recording on tape, time accumulator means for indicating elapsed time by a group of time digits in binary coded form for direct recording on tape, a word counter for cyclically counting the number of digits transferred to the magnetic tape to determine when a complete word has been transferred to tape, a source counter for cyclically activating in successive count conditions the time accumulator means, and the commutating means and digitizing means, means controlled by the word counter for transferring said group of time digits from the time accumulator means to magnetic tape when the time accumulator means is activated by the source counter, means responsive to the completion of a cycle of the word counter, the count condition of the source counter, and the transfer of the last digit of said group of time digits to the magnetic tape for advancing the source counter to the activating condition for the commutating means and the digitizing means, means responsive to the word counter for advancing the commutator means to initiate digitized samples at selected intervals in synchronism with the counting of word counter, said commutator advancing means including means for selecting the number of samples initiated during one cycle of the word counter, means responsive to the advancing of the commutating means for sensing the number of samples digitized, means for periodically recycling the source counter following a predetermined number of samples, the number of samples being preset as desired, and time delay means for interrupting the word counter for a delay interval following the last of said predetermined number of samples while the tape is running to insert a block gap on the tape after the predetermined number of samples have been digitized and transferred to tape.

16. Apparatus for recording a number of analog input channels of information in digitized form on magnetic tape, the apparatus comprising means for recording binary bits in lines on magnetic tape, commutating means for successively sampling the input channels, digitizing means coupled to the output of the commutating means for converting the voltage level of each channel sample to a group of data digits in binary coded form for direct recording on tape, time accumulator means for indicating elapsed time by a group of time digits in binary coded form for direct recording on tape, a word counter for cyclically counting the number of digits transferred to the magnetic tape to determine when a complete word has been transferred to tape, a source counter for cyclically activating in successive count conditions the time accumulator means, and the commutating means and digitizing means, means controlled by the word counter for transferring said group of time digits from the time accumulator means to magnetic tape when the time accumulator means is activated by the source counter, means responsive to the completion of a cycle of the word counter, the count condition of the source counter, and the transfer of the last digit of said group of time digits to the magnetic tape for advancing the source counter to the activating condition for the commutating means and the digitizing means, means responsive to the word counter for advancing the commutator means to initiate digitized samples at selected intervals in synchronism with the counting of the word counter, said commutator advancing means including means for selecting the number of samples initiated during one cycle of the word counter, means responsive to the advancing of the commutating means for sensing the number of samples digitized, and means for periodically recycling the source counter following a predetermined number of samples, the number of samples being preset as desired.

References Cited in the file of this patent

UNITED STATES PATENTS

| | | |
|---|---|---|
| 2,787,418 | Macknight et al. | Apr. 2, 1957 |
| 2,918,657 | Crampton et al. | Dec. 22, 1959 |
| 2,918,662 | Cox et al. | Dec. 22, 1959 |